(12) United States Patent
Walker

(10) Patent No.: US 7,187,094 B1
(45) Date of Patent: Mar. 6, 2007

(54) APPARATUS AND METHOD OF TERMINATING AND SECURING LEAD WIRES TO A STATOR

(75) Inventor: James M. Walker, Fond du Lac, WI (US)

(73) Assignee: R.E. Phelon Company, Inc., Aiken, SC (US)

( * ) Notice: Subject to any disclaimer, the term of this patent is extended or adjusted under 35 U.S.C. 154(b) by 0 days.

(21) Appl. No.: 10/700,731

(22) Filed: Nov. 3, 2003

Related U.S. Application Data

(60) Provisional application No. 60/423,125, filed on Nov. 1, 2002.

(51) Int. Cl.
    *H02K 11/00* (2006.01)
(52) U.S. Cl. ..................................... 310/71
(58) Field of Classification Search ............ 310/42–45, 310/71, 179, 180, 184–185, 198, 208, 254, 310/259–260, 74; 29/596, 598
    See application file for complete search history.

(56) References Cited

U.S. PATENT DOCUMENTS 5,606,208 A * 2/1997 Sakashita et al. ............. 310/71
6,137,198 A * 10/2000 Kawamura .................... 310/71
6,333,579 B1 12/2001 Hirano et al.
6,836,048 B2 * 12/2004 Morimatsu ................... 310/198

FOREIGN PATENT DOCUMENTS

JP          10271735         * 10/1998

* cited by examiner

*Primary Examiner*—Darren Schuberg
*Assistant Examiner*—Nguyen Hanh
(74) *Attorney, Agent, or Firm*—Nicholas A. Kees; Godfrey & Kahn, S.C.

(57) ABSTRACT

A stator for use in internal combustion engine, the stator comprises a central core having a top surface, a bottom surface, and a plurality of openings extending therethrough. The central core includes a plurality of poles extending outwardly from the periphery of the core. The periphery of the core and the poles are electrically insulated from the central core by an insulating material. Wire is wound on the poles to produce wire coils around each of the poles. The wire coils are electrically connected to lead wires from ignition and/or charging system circuitry or components. Wires from the wire coils and the lead wires are inserted into at least one of the openings in the central core where they are terminated and secured with lead wires from ignition and/or charging system circuitry or components. The wires from the wire coils and the lead wires can also be connected prior to their insertion into the openings wherein the connected wires are secured. The lead wires come out from the openings and are routed between poles of the stator. Epoxy is inserted into the openings and between the poles to secure the connected wires in place.

30 Claims, 5 Drawing Sheets

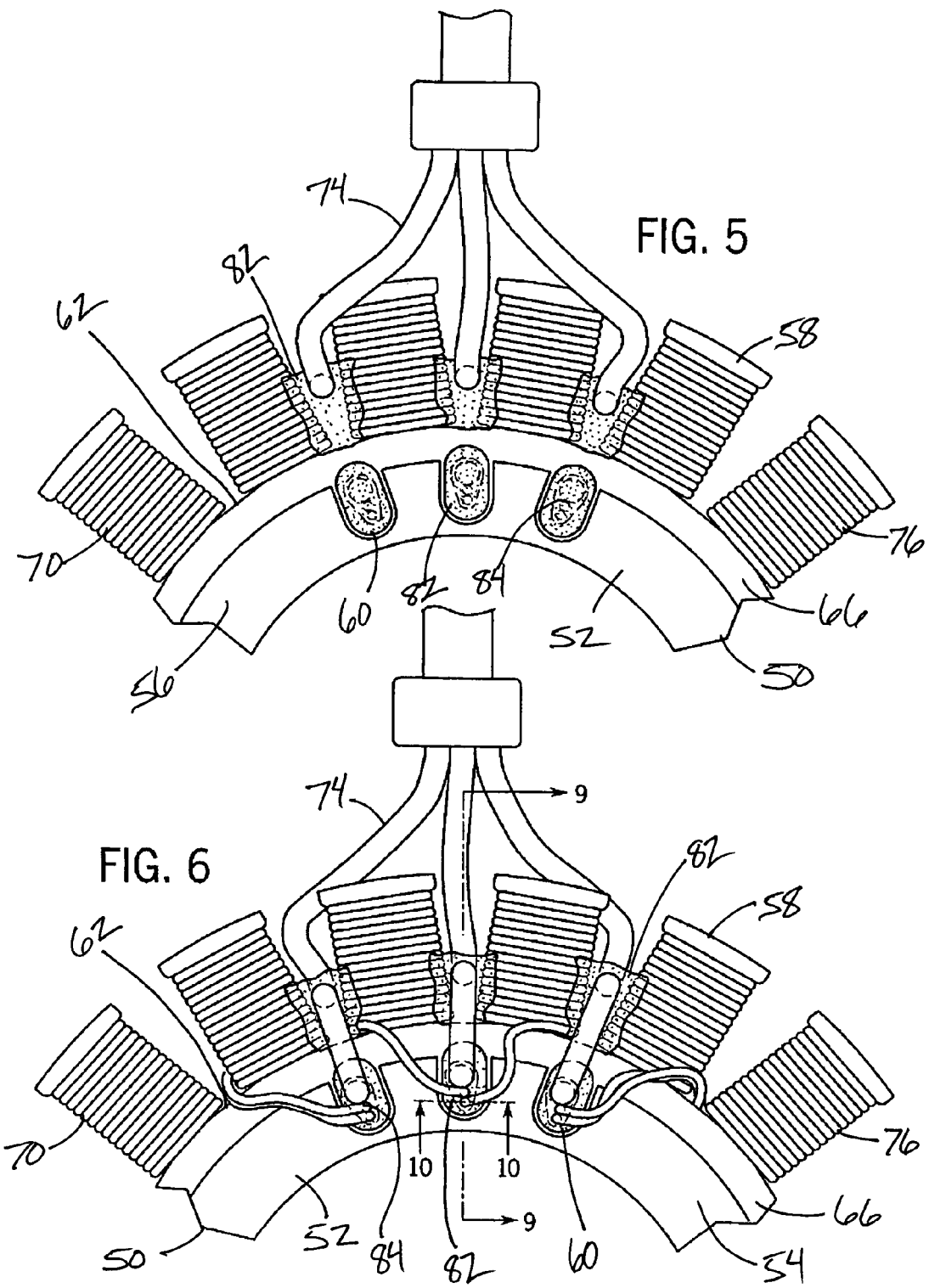

APPARATUS AND METHOD OF TERMINATING AND SECURING LEAD WIRES TO A STATOR

CROSS-REFERENCE TO RELATED APPLICATIONS

This application claims priority to U.S. Provisional Application No. 60/423,125, filed on Nov. 1, 2002, which is incorporated herein by reference.

BACKGROUND OF THE INVENTION

The present invention relates generally to an apparatus and method of terminating and securing wires to a stator for an internal combustion engine, and more particularly to a multiple pole stator having a plurality of openings extending through the core of the stator for terminating and securing lead wires therein. The design of the present invention provides a more reliable and more cost effective method of terminating and securing lead wires to a stator.

A stator for use in ignition and charging systems of an internal combustion engine typically comprises a central core having a plurality of poles extending outwardly from the periphery of the core. The periphery of the core and the poles are electrically insulated from the central core by an insulating material. Wire is wound on the poles to produce wire coils around each of the poles. The wire coils are electrically connected to lead wires from ignition or charging system circuitry and/or components by soldering, brazing, crimping, splicing, or other known methods of connecting wires together. In the prior art, this wire connection and termination is made between stator poles. The termination is encapsulated with an epoxy or potting compound to hold the wires in place. Examples of prior art stator assemblies are shown in FIGS. 1–4.

Referring to the drawings, FIGS. 1 and 2 illustrate one embodiment of a prior art stator assembly 10 illustrating termination and securing of lead wires 12 between stator poles 14. As shown, the termination area 16 between the wire coils 18 on the stator poles 14 is completely encapsulated by an epoxy or potting compound 20. This prevents airflow through and around the poles 14, increasing the operating temperature of the stator and possibly causing failures. Also, the lead wires 12 are shown extending above the top of the stator 10, requiring a significant clearance area above the stator in its final assembly.

FIGS. 3 and 4 illustrate another embodiment of a prior art stator assembly 30 illustrating termination and securing of lead wires 32 between stator poles 34. This embodiment also shows the termination area 36 between the wire coils 38 of the stator poles 34 being completely encapsulated by an epoxy or potting compound 40, thus preventing airflow through and around the poles 34. The lead wires 32 are also shown extending above the top of the stator 30, requiring a significant clearance area above the stator in its final assembly.

Additional problems with prior art terminations include fitting the termination between the poles of the stator. Often, the wire coils around the poles are so close together that the termination will not fit. The termination is typically taped or covered with shrink sleeving, increasing its size. There are also problems with shorts occurring between the lead wires and the insulated copper wires of the wire coils wound around the stator poles. Wires soldered or crimped together can have sharp burrs that pierce the tape or shrink sleeve covering the termination causing shorts between the termination and wire coils because of the termination's proximity to the wire coils.

U.S. Pat. No. 6,137,198 discloses a stator for a magneto generator comprising a stator core having a holding fixture mounted to the top of the stator core for connecting lead wires to the wire coils wound around the stator poles. This invention does not solve all of the problems discussed above, because the wires extend too far above the stator core. The stator in the '198 patent is mounted on a crankcase cover where there is enough clearance above the stator for wires to extend. There are other applications, such as in the present invention, where the stator is mounted under a rotor on the crankcase. With the rotor mounted above the stator, there is very little room between the stator and the rotor for wires to extend.

SUMMARY OF THE INVENTION

The present invention provides a stator comprising a plurality of poles extending outwardly from a central core. The central core has a plurality of openings extending therethrough for terminating and securing lead wires to the wire coils within the openings. The wire termination openings formed in the core of the stator can be configured in any shape or size to fit the desired application. The wire termination of the present invention provides a secure lock of the wire for applications that require a high pulling force strength. The lead wires are locked into place in the opening, requiring a much stronger force to pull them out.

The method of wire termination of the present invention can be used for a plurality of stator types with any number of stator poles. For example, the invention applies to powder coated steel stators having multiple poles, over molded steel stators with injection molded parts attached thereto, and virtually any other type of radial and/or axial stator. For over molded stators, the termination openings are molded into the injection molded plastic core that is molded over the steel stator.

There are a number of advantages of the present invention. In the steel coating process, be it powder coating, over molding or any other method used to insulate the steel before winding, the openings in the central core of the stator can be insulated along with the periphery of the core and poles at no additional labor or cost. Also, taping or covering of the wire termination with shrink sleeving can be eliminated. The method of wire termination of the present invention also allows for less epoxy fill between the stator poles resulting in lower operating temperatures of the stator. The method of wire termination of the present invention also eliminates the possibility of shorts occurring between the lead wires and the wire coils.

The present invention provides a cost savings for engine manufacturers by providing fewer components to assemble, increased production, and reduced labor costs.

The present invention also contemplates a method of terminating and securing lead wires within openings in the central core of the stator.

Various other features, objects, and advantages of the invention will be made apparent to those skilled in the art from the accompanying drawings and detailed description thereof.

BRIEF DESCRIPTION OF THE DRAWINGS

FIG. 5 is a bottom plan view of one embodiment of a stator of the present invention illustrating termination and securing of lead wires within openings in the stator core;

FIG. 6 is a top plan view of the stator of FIG. 5;

DETAILED DESCRIPTION OF THE INVENTION

Figure 1:
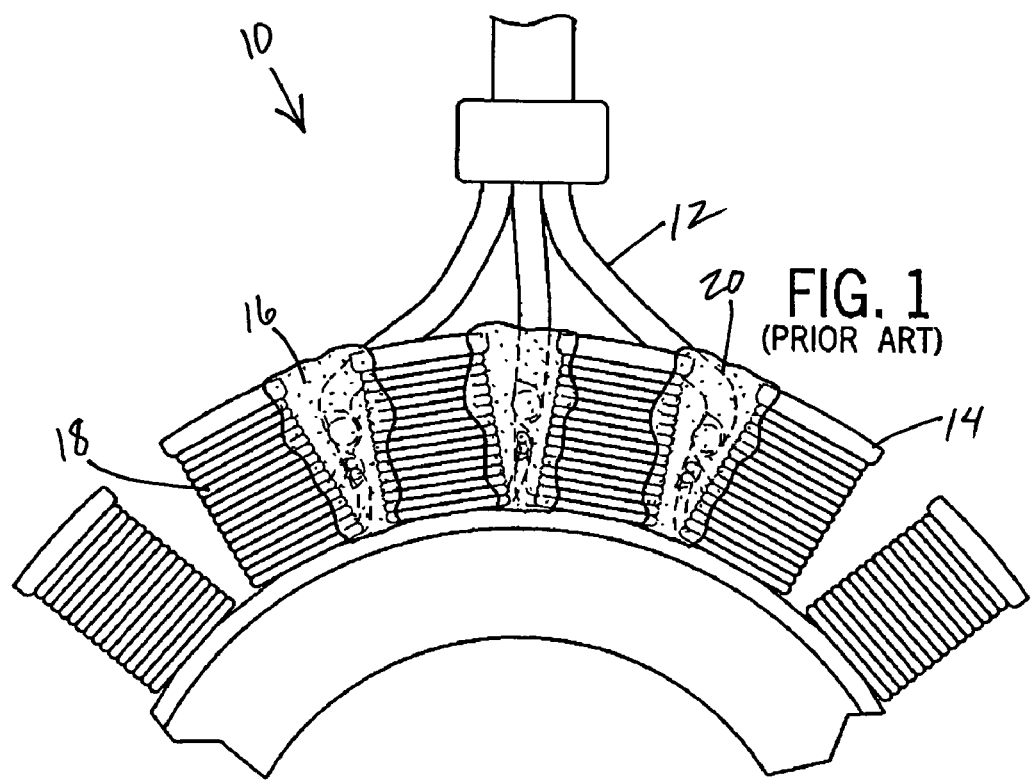
FIG. 1 is a bottom plan view of one embodiment of a prior art stator illustrating termination and securing of lead wires between the stator poles.

Referring again to the drawings, FIGS. 5 and 6 illustrate one embodiment of the present invention illustrating termination and securing of lead wires within a plurality of openings in a stator core. The stator 50 preferably comprises a central core 52 having a top surface 54, a bottom surface 56, and a plurality of openings 60 extending therethrough. The central core 52 preferably includes a plurality of poles 58 extending outwardly from the periphery 62 of the core 52. The periphery 62 of the core 52 and the poles 58 are electrically insulated from the central core 52 by an insulating material 66. Wire 76 is preferably wound on the poles 58 to produce wire coils 70 around each of the poles 58. The wire coils 70 are electrically connected to lead wires 74 from ignition and/or charging system circuitry or components (not shown) by soldering, brazing, crimping, splicing, or other known methods of connecting wires together. The termination 84 is encapsulated with an epoxy or potting compound 82 to hold the connected wires 74, 76 in place. Wires 76 from the wire coils 70 are inserted into at least one of the openings 60 in the central core 52 where they are terminated and secured with lead wires 74 from ignition and/or charging system circuitry or components (not shown). The wires 76 from the wire coils 70 can also be terminated prior to their insertion into the openings 60 for securing therein. The lead wires 74 come out from the openings 60 and are routed between poles 58 of the stator 50. Epoxy 82 is inserted into the openings 60 and between the poles 58 to secure the connected wires 74, 76 in place. At least one of the openings 60 in the central core 52 may be used for three-phase stator applications, as shown in FIGS. 5 and 6.

Figure 2:
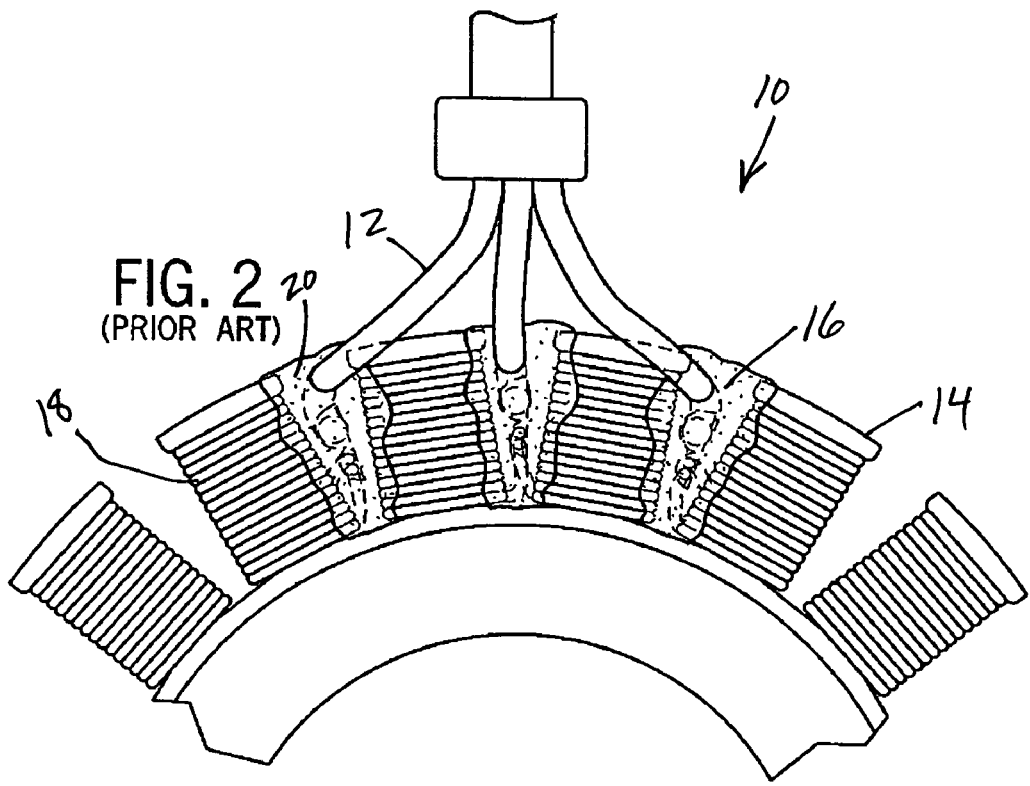
FIG. 2 is a top plan view of the prior art stator of FIG. 1.
Figure 3:
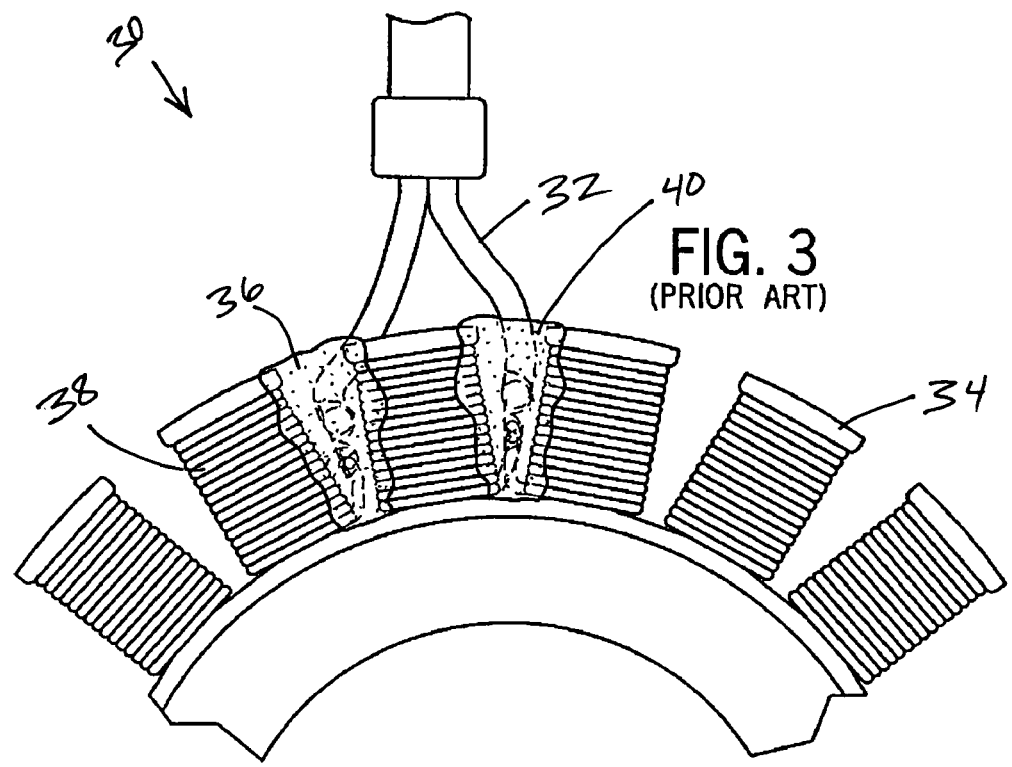
FIG. 3 is a bottom plan view of another embodiment of a prior art stator illustrating termination and securing of lead wires between the stator poles.
Figure 4:
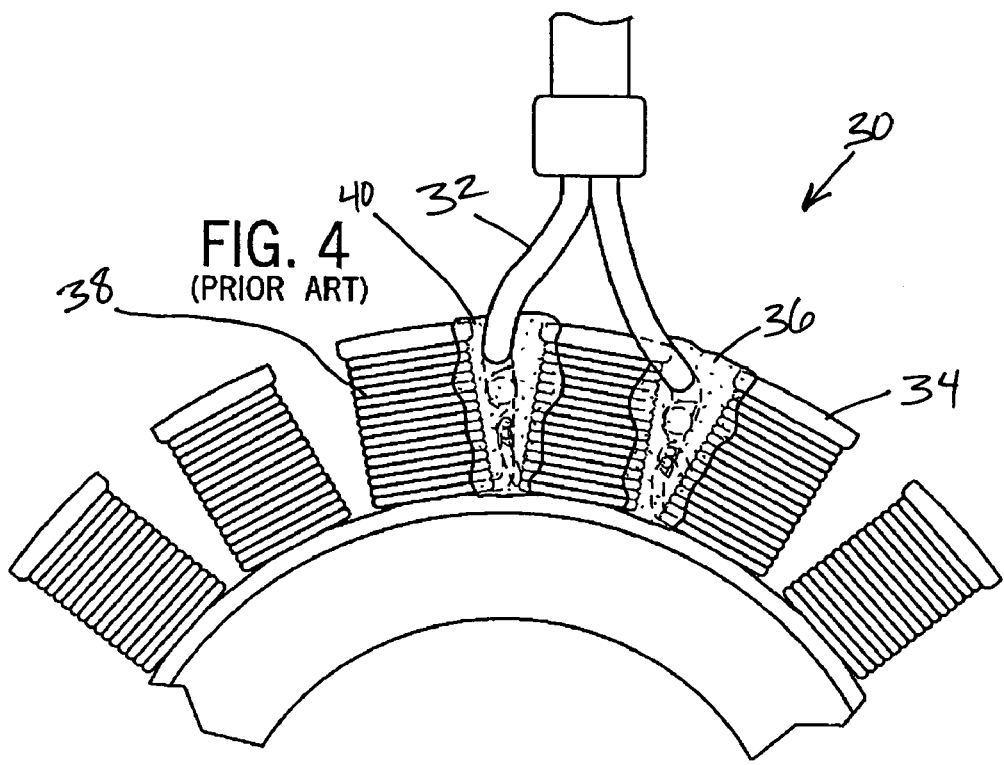
FIG. 4 is a top plan view of the prior art stator of FIG. 3.
Figure 7:
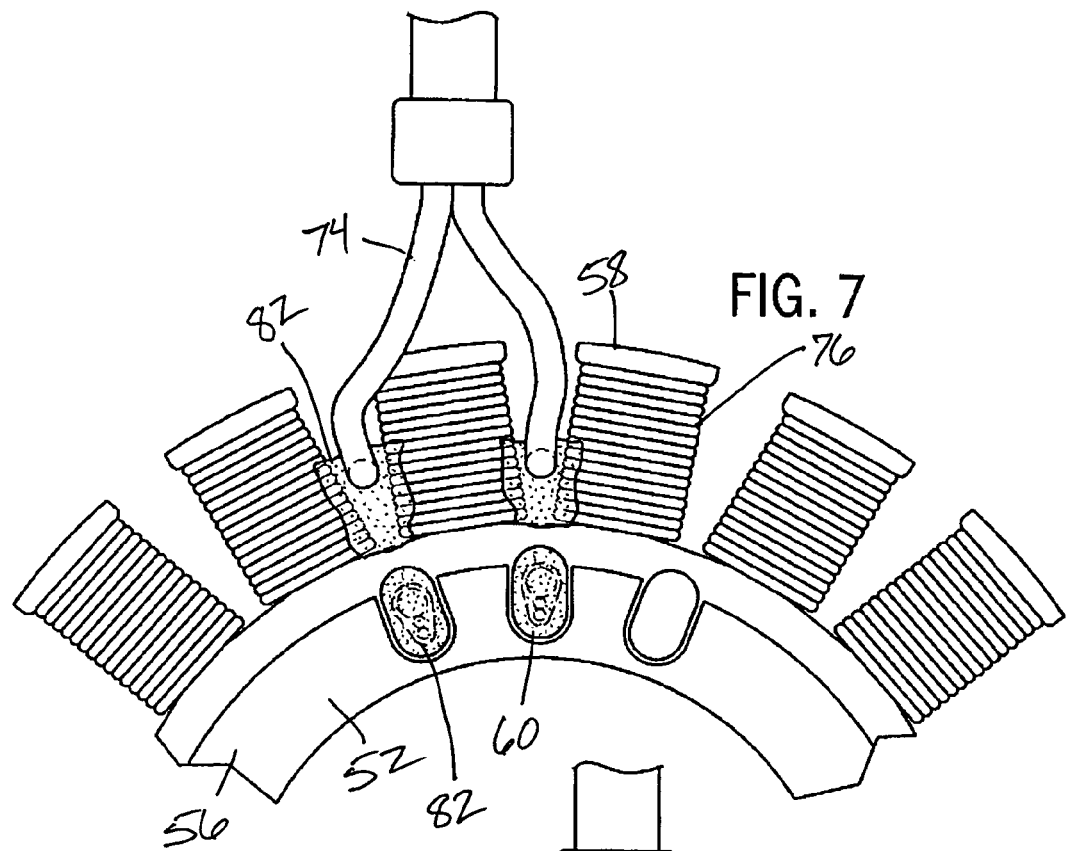
FIG. 7 is a bottom plan view of another embodiment of a stator of the present invention illustrating termination and securing of lead wires within openings in the stator core.
Figure 8:
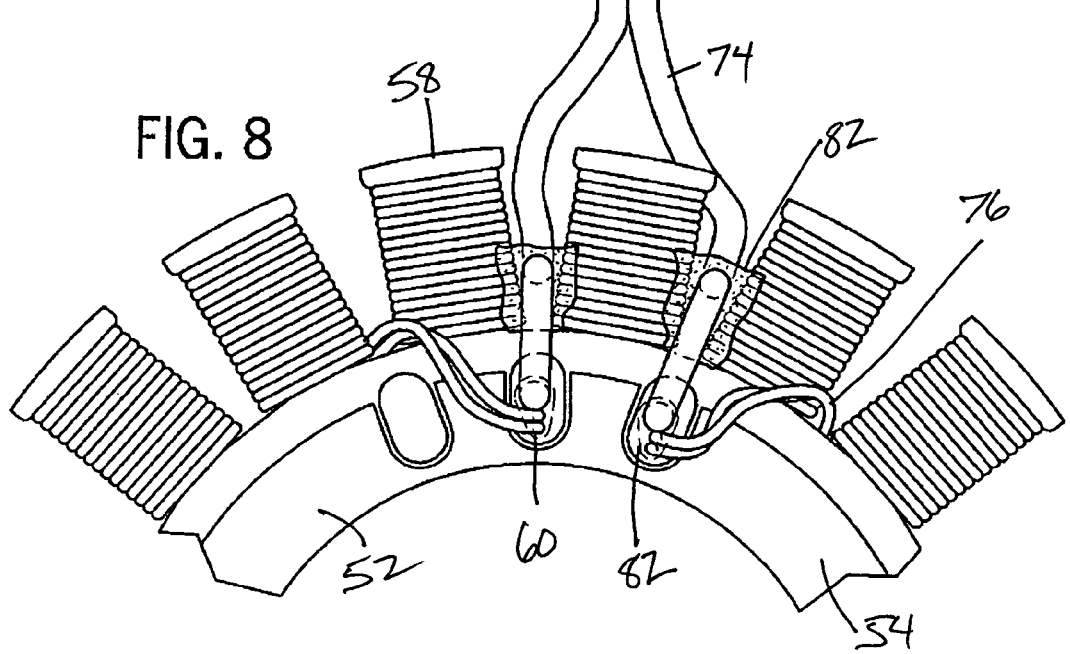
FIG. 8 is a top plan view of the stator of FIG. 7.

FIGS. 7 and 8 illustrate another embodiment of the present invention illustrating termination and securing of two lead wires within at least two openings in the stator core. FIGS. 5, 6, 7 and 8 show the central core 52 with a plurality of openings 60 extending therethrough. Epoxy 82 is shown in the openings 60 and between the poles 58 to secure the connected wires 74, 76 in place. FIGS. 5, 6, 7 and 8 also show the lead wires 74 routed between poles 58 of the stator 50. The lead wires 74 then extend below the bottom surface 56 of the central core 52, as opposed to extending above the top surface 54 of the central core 52 as shown in prior art FIGS. 2 and 4. The embodiments of the present invention are more suitable than the prior art stators for applications where there is very little room between the stator and the rotor for wires to extend.

Figure 9:
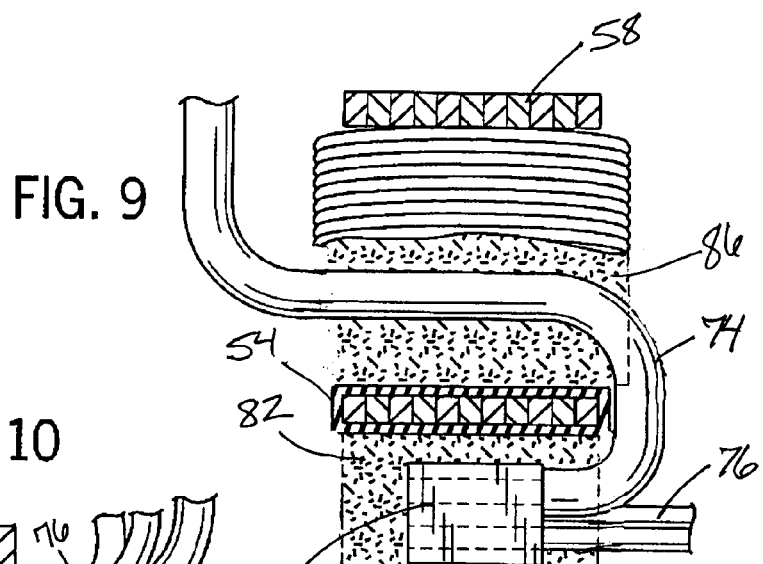
FIG. 9 is a cross-sectional view of the stator of FIG. 6 taken along line 9—9 of FIG. 6.

FIG. 9 is a cross-sectional view of the stator 50 taken along line 9—9 of FIG. 6. FIG. 9 shows the connected wires 74, 76 connected via termination 84 within an opening 60. The opening 60 is preferably filled with epoxy 82. The epoxy 82 is at most flush with, but preferably below the top surface of the central core. The connected wires 74, 76 come out of the opening 60 on the top surface 54 of the central core 52 and the lead wire 74 is then routed through the open space 86 between two poles 58. Epoxy is preferably applied to the open space 86 between the two poles 58.

Figure 10:
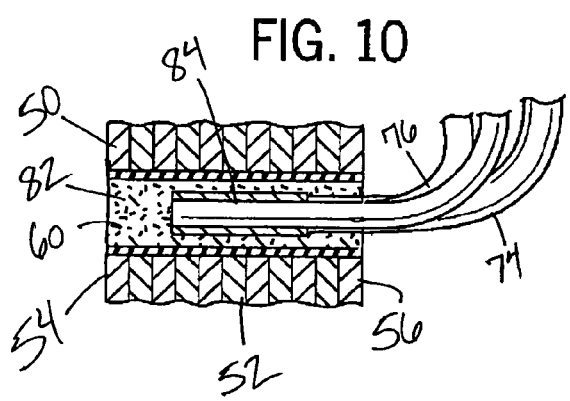
FIG. 10 is a cross-sectional view of the stator of FIG. 6 taken along line 10—10 of FIG. 6.

FIG. 10 is a cross-sectional view of the stator 50 taken along lines 10—10 of FIG. 6. FIG. 10 shows a plurality of wires 74, 76 connected together within an opening 60 of the central core 52. The connected wires 74, 76 are recessed into the top of the opening 60 and the termination 84 does not protrude out of the opening 60 past the top surface 54 or bottom surface 56 of the central core 52. The opening 60 is preferably filled with epoxy 82 after insertion of the connected wires 74, 76 into the opening 60. The epoxy 82 is at most flush with, but preferably, below the top surface 54 of the central core 52.

The present invention requires a reduced amount of epoxy 82 needed to hold the connected wires 74, 76 in place, providing more air gaps 86 between the poles 58 for better cooling of the stator 50 during operation, as shown in FIGS. 5–8. The openings 60 also allow better retention of the connected wires 74, 76. The wire termination 84 in the openings 60 provides a secure lock of the termination 84 for applications that require a high pulling force strength. The insulating material 66, such as powder coating, extends around the periphery of the central core 52, around the poles 58 and through the openings 60 in the stator 50. The stator assembly of the present invention is easier to manufacture, requires less parts, and provides reduced labor costs than prior art stator assemblies.

During the stator coating or insulating process, an insulating material is applied to the periphery of the stator core along with the poles and openings extending through the stator core. The coating process, be it powder coating, over molding or any other method is used to insulate the stator core before winding. The openings extending through the central core are insulated with an insulating material at the same time as the periphery of the core and the poles, so that the wire crimps may be inserted into the openings without the need for any insulating tape or insulating connector, thereby saving production costs and assembly time.

Figure 11:
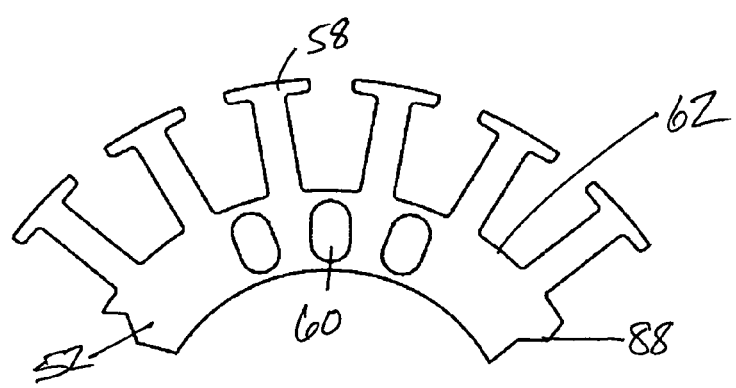
FIG. 11 is a top plan view of one embodiment of a steel lamination of a stator of the present invention.
Figure 12:
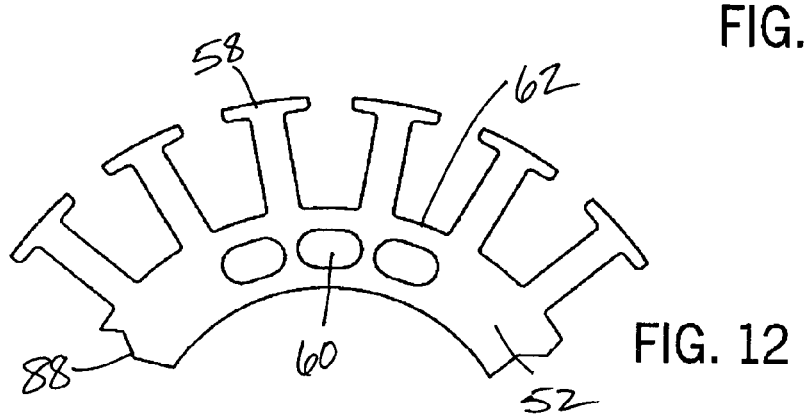
FIG. 12 is a top plan view of another embodiment of a steel lamination of the stator of the present invention.

The stator 50 is preferably stamped from lamination steel to provide a plurality of openings 60 for terminating and securing a plurality of connected wires 74, 76 therein. FIGS. 11 and 12 are top views of two embodiments of steel laminations for a stator of the present invention. The steel laminations 88 are oriented, aligned, bonded, heat cured and machined to form bonded stator stacks. The steel laminations 88 are stamped to provide a central core 52 with a plurality of poles 58 extending from the periphery 62 thereof, and a plurality of wire termination openings 60 extending through the central core 52. The wire termination openings 60 in the steel laminations 88 are stamped into the steel laminations 88 during the initial lamination stamping process. The steel laminations 88 may also be stamped to provide a larger central core 52 for mounting ignition and/or regulator circuitry or components (not shown) thereto. The wire termination openings 60 can be of any shape or orientation to accommodate the particular application. For example, FIG. 11 shows oval-shaped, vertically oriented openings 60, and FIG. 12 shows oval-shaped, horizontally oriented openings 60. The wire termination openings 60 are sized and shaped to fit particular wires for a particular application. As well, the steel laminations 88 can be stamped to provide a variety shapes, sizes, and configurations for the poles, core, and wire termination openings needed for various applications.

The present invention also contemplates an embodiment of an over molded steel stator having an injection molded plastic molding molded over the steel laminations. The plastic molding has a plurality of openings or cut-outs in the stator core for terminating and securing lead wires therein. The plastic molding also preferably has areas for adding electronic circuitry or components onto the stator. The method of wire termination of the present invention lends itself to mounting of press fit diodes, rectifiers and/or SCRs onto the stator core for termination with the wire coils, thereby providing a product with a rectified output waveform.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention.

What is claimed is:

1. A stator for use in an internal combustion engine, the stator comprising:
   a central core having a top surface, a bottom surface, and a plurality of poles extending outwardly from the periphery of the central core;
   the periphery of the central core and the poles being electrically insulated from the central core by an insulating material;
   wire coils wound around each of the poles, wires from the wire coils being electrically connected to lead wires from ignition or charging system circuitry or components; and
   the central core having a plurality of wire termination openings extending therethrough for electrically connecting and securing the lead wires to the wires from the wire coils within the openings;
   wherein space between at least two of the poles is filled with epoxy or a potting compound to hold the connected wires in place.

2. A stator for use in an internal combustion engine, the stator comprising:
   a central core having a top surface, a bottom surface, and a plurality of poles extending outwardly from the periphery of the central core;
   the periphery of the central core and the poles being electrically insulated from the central core by an insulating material;
   wire coils wound around each of the poles, wires from the wire coils being electrically connected to lead wires from ignition or charging system circuitry or components; and
   the central core having a plurality of wire termination openings extending therethrough for electrically connecting and securing the lead wires to the wires from the wire coils within the openings;
   wherein the lead wires come out of the openings and are routed between the poles.

3. The stator of claim 2, wherein the lead wires are electrically connected to the wire coils within the openings by soldering, brazing, crimping, or splicing.

4. The stator of claim 2, wherein the stator is a multiple pole stator formed of powder coated steel.

5. The stator of claim 2, wherein the stator is a multiple pole stator formed of over molded steel with injection molded parts attached thereto.

6. The stator of claim 5, wherein the stator has an injection molded plastic core molded over the steel stator.

7. The stator of claim 6, wherein the openings are molded into and extend through the injection molded plastic core.

8. The stator of claim 2, wherein the insulating material is a powder coating.

9. The stator of claim 2, wherein the insulating material is over molded plastic.

10. The stator of claim 2, wherein the openings extending through the central core are insulated simultaneously with the periphery of the core with the same insulating material.

11. The stator of claim 2, wherein the stator is stamped from lamination steel having a plurality of openings stamped through the lamination steel for electrically connecting the wires from the wire coils to the lead wires therein.

12. The stator of claim 2, wherein the connected wires are recessed into the openings and the connection area of the wires does not protrude out of the openings past the top surface or the bottom surface of the central core.

13. A stator for use in an internal combustion engine, the stator comprising:
    a central core having a top surface, a bottom surface, and a plurality of poles extending outwardly from the periphery of the central core;
    the periphery of the central core and the poles being electrically insulated from the central core by an insulating material;
    wire coils wound around each of the poles, wires from the wire coils being electrically connected to lead wires from ignition or charging system circuitry or components; and
    the central core having a plurality of wire termination openings extending therethrough for electrically connecting and securing the lead wires to the wires from the wire coils within the openings;
    wherein the openings are filled with epoxy or a potting compound to hold the connected wires in place; and
    wherein the epoxy in the openings is flush with or below the top surface of the central core.

14. The stator of claim 13, wherein the injection molded plastic core includes areas for adding electronic circuitry or components onto the stator.

15. The stator of claim 13, wherein at least one of the openings is used for three-phase stator applications.

16. A stator for use in ignition and charging systems of an internal combustion engine, the stator comprising:
    a central core having a top surface, a bottom surface, and a plurality of poles extending outwardly from the periphery of the central core;
    the periphery of the central core and the poles being electrically insulated from the central core by an insulating material;
    wire coils wound around each of the poles, wires from the wire coils being electrically connected to lead wires from ignition or charging system circuitry or components; and
    the central core having a plurality of wire termination openings extending therethrough for securing the connected wires within the openings;

wherein space between at least two of the poles is filled with epoxy or a potting compound to hold the connected wires in place.

17. A stator for use in ignition and charging systems of an internal combustion engine, the stator comprising:
a central core having a top surface, a bottom surface, and a plurality of poles extending outwardly from the periphery of the central core;
the periphery of the central core and the poles being electrically insulated from the central core by an insulating material;
wire coils wound around each of the poles, wires from the wire coils being electrically connected to lead wires from ignition or charging system circuitry or components; and
the central core having a plurality of wire termination openings extending therethrough for securing the connected wires within the openings;
wherein the lead wires come out of the openings and are routed between the poles.

18. The stator of claim 17, wherein the lead wires are electrically connected to the wire coils within the openings by soldering, brazing, crimping, or splicing.

19. The stator of claim 17, wherein the stator is a multiple pole stator formed of powder coated steel.

20. The stator of claim 17, wherein the stator is a multiple pole stator formed of over-molded steel with injection molded parts attached thereto.

21. The stator of claim 20, wherein the stator has an injection molded plastic core molded over the steel stator.

22. The stator of claim 21, wherein the openings extending through the stator core are molded into the injection molded plastic core.

23. The stator of claim 21, wherein the injection molded plastic core includes areas for adding electronic circuitry or components onto the stator.

24. The stator of claim 17, wherein the insulating material is a powder coating.

25. The stator of claim 17, wherein the insulating material is over molded plastic.

26. The stator of claim 17, wherein the openings extending through the central core are insulated simultaneously with the periphery of the core with the same insulating material.

27. The stator of claim 17, wherein the stator is stamped from lamination steel having a plurality of openings stamped through the lamination steel for securing the connected wires therein.

28. The stator of claim 17, wherein the connected wires are recessed into the openings and the connection area of the wires does not protrude out of the openings past the top surface or the bottom surface of the central core.

29. The stator of claim 17, wherein at least one of the openings is used for three-phase stator applications.

30. A stator for use in ignition and charging systems of an internal combustion engine, the stator comprising:
a central core having a top surface, a bottom surface, and a plurality of poles extending outwardly from the periphery of the central core;
the periphery of the central core and the poles being electrically insulated from the central core by an insulating material;
wire coils wound around each of the poles, wires from the wire coils being electrically connected to lead wires from ignition or charging system circuitry or components; and
the central core having a plurality of wire termination openings extending therethrough for securing the connected wires within the openings;
wherein the openings are filled with epoxy or a potting compound to hold the connected wires in place; and
wherein the epoxy in the openings is flush with or below the top surface of the central core.

* * * * *